United States Patent
Chopra et al.

(10) Patent No.: US 10,834,189 B1
(45) Date of Patent: Nov. 10, 2020

(54) SYSTEM AND METHOD FOR MANAGING WORKLOAD IN A POOLED ENVIRONMENT

(71) Applicant: EMC IP Holding Company LLC, Hopkinton, MA (US)

(72) Inventors: Shelesh Chopra, Bangalore (IN); Gururaj Kulkarni, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 65 days.

(21) Appl. No.: 15/866,584

(22) Filed: Jan. 10, 2018

(51) Int. Cl.
*G06F 13/00* (2006.01)
*H04L 29/08* (2006.01)

(52) U.S. Cl.
CPC ...... *H04L 67/1097* (2013.01); *H04L 67/1008* (2013.01); *H04L 67/1031* (2013.01)

(58) Field of Classification Search
CPC ......... H04L 29/08171; H04L 29/08144; H04L 29/08153; H04L 67/1004; H04L 67/1008; H04L 67/1036; H04L 67/1097; H04L 67/1031; G06F 3/0644; G06F 3/0629; G06F 9/5016; G06F 9/505
USPC ......... 709/225, 226, 229, 217–219; 718/104, 718/105, 100–103
See application file for complete search history.

(56) References Cited

U.S. PATENT DOCUMENTS

| | | |
|---|---|---|
| 5,493,689 A | 2/1996 | Waclawsky et al. |
| 5,606,693 A | 2/1997 | Nilsen et al. |
| 5,668,986 A | 9/1997 | Nilsen et al. |
| 6,298,451 B1 | 10/2001 | Lin |
| 6,421,317 B1 | 7/2002 | Denecheau et al. |
| 6,665,812 B1 | 12/2003 | Blumenau et al. |
| 6,826,711 B2 | 11/2004 | Moulton et al. |
| 7,246,207 B2 | 7/2007 | Kottomtharayil et al. |
| 7,263,529 B2 | 8/2007 | Cordery et al. |
| 7,302,450 B2 | 11/2007 | Benedetti et al. |
| 7,315,923 B2 | 1/2008 | Retnamma et al. |
| 7,343,453 B2 | 3/2008 | Prahlad et al. |
| 7,346,686 B2 | 3/2008 | Albert et al. |
| 7,590,736 B2 * | 9/2009 | Hydrie ............ H04L 29/06 709/226 |
| 7,664,847 B2 | 2/2010 | Colrain et al. |
| 7,954,143 B2 * | 5/2011 | Aaron ............ H04L 63/102 713/166 |

(Continued)

FOREIGN PATENT DOCUMENTS

EP    2677721 A1    12/2013

OTHER PUBLICATIONS

"Defenders of the Virtual World"; EMC Corporation, EMC Backup, Recovery & Archive Solutions, Backup Recovery Systems Division; Jun. 7, 2012 (59 pages).

(Continued)

*Primary Examiner* — Kenneth R Coulter
(74) *Attorney, Agent, or Firm* — Chamberlain, Hrdlicka, White, Williams & Aughtry

(57) ABSTRACT

An orchestrator for assigning clients to storage gateway pools includes a persistent storage and a processor. The persistent storage includes workload to pool mappings. The processor obtains a data storage request for data from a client of the clients; identifies a workload type associated with the data; selects a storage gateway pool of the storage gateway pools using the identified workload type and the workload to pool mappings; and assigns the selected storage gateway pool to service the data storage request.

20 Claims, 12 Drawing Sheets

(56) References Cited

U.S. PATENT DOCUMENTS

| | | | |
|---|---|---|---|
| 8,122,146 B1* | 2/2012 | Lu | H04L 67/1017 709/236 |
| 8,156,086 B2 | 4/2012 | Lu et al. | |
| 8,156,502 B1 | 4/2012 | Blanding | |
| 8,209,696 B2 | 6/2012 | Ferguson et al. | |
| 8,286,174 B1 | 10/2012 | Schmidt et al. | |
| 8,375,396 B2 | 2/2013 | Pooni et al. | |
| 8,387,054 B1 | 2/2013 | Zeis et al. | |
| 8,412,900 B1 | 4/2013 | Sano et al. | |
| 8,458,210 B2 | 6/2013 | Arifuddin et al. | |
| 8,549,247 B2 | 10/2013 | Satoyama et al. | |
| 8,578,120 B2 | 11/2013 | Attarde et al. | |
| 8,656,047 B1* | 2/2014 | Lu | H04L 45/74 709/236 |
| 8,695,012 B2 | 4/2014 | Kanso et al. | |
| 8,782,256 B2 | 7/2014 | Dec et al. | |
| 8,965,921 B2 | 2/2015 | Gajic | |
| 8,972,326 B2 | 3/2015 | Prathaban et al. | |
| 9,032,090 B1* | 5/2015 | Lu | H04L 47/2466 709/236 |
| 9,069,482 B1 | 6/2015 | Chopra et al. | |
| 9,141,435 B2 | 9/2015 | Wein | |
| 9,172,750 B2 | 10/2015 | Bulkowski et al. | |
| 9,235,579 B1 | 1/2016 | Suarez | |
| 9,356,877 B1* | 5/2016 | Lu | H04L 67/1017 |
| 9,372,637 B1 | 6/2016 | Alatorre et al. | |
| 9,444,884 B2* | 9/2016 | Newton | H04L 67/1008 |
| 9,489,270 B2 | 11/2016 | Anglin et al. | |
| 9,519,432 B1 | 12/2016 | Haustein et al. | |
| 9,672,116 B1 | 6/2017 | Chopra et al. | |
| 9,838,332 B1 | 12/2017 | Smith | |
| 9,954,785 B1* | 4/2018 | Lu | H04L 29/06 |
| 10,013,189 B1 | 7/2018 | Yang et al. | |
| 10,250,488 B2 | 4/2019 | Cropper et al. | |
| 10,412,022 B1 | 9/2019 | Tang et al. | |
| 10,423,459 B1 | 9/2019 | Jacques de Kadt et al. | |
| 2001/0054095 A1 | 12/2001 | Kampe et al. | |
| 2002/0194345 A1* | 12/2002 | Lu | H04L 67/1017 709/227 |
| 2003/0224781 A1 | 12/2003 | Milford et al. | |
| 2004/0153708 A1 | 8/2004 | Joshi et al. | |
| 2004/0186844 A1 | 9/2004 | Muhlestein | |
| 2005/0010727 A1 | 1/2005 | Cuomo et al. | |
| 2005/0033818 A1 | 2/2005 | Jardin | |
| 2005/0149940 A1 | 7/2005 | Calinescu et al. | |
| 2006/0101224 A1 | 5/2006 | Shah et al. | |
| 2007/0180314 A1 | 8/2007 | Kawashima et al. | |
| 2007/0198797 A1 | 8/2007 | Kavuri et al. | |
| 2007/0220319 A1 | 9/2007 | Desai et al. | |
| 2008/0115190 A1* | 5/2008 | Aaron | H04L 63/0227 726/1 |
| 2008/0140960 A1 | 6/2008 | Basler et al. | |
| 2008/0222297 A1 | 9/2008 | Mengerink | |
| 2009/0070489 A1* | 3/2009 | Lu | H04L 47/19 709/245 |
| 2009/0144388 A1 | 6/2009 | Gross et al. | |
| 2009/0164832 A1 | 6/2009 | Kanso et al. | |
| 2010/0017445 A1 | 1/2010 | Kobayashi | |
| 2011/0022812 A1 | 1/2011 | van der Linden et al. | |
| 2011/0153941 A1 | 6/2011 | Spatscheck et al. | |
| 2011/0178831 A1 | 7/2011 | Ravichandran | |
| 2012/0059934 A1 | 3/2012 | Rafiq et al. | |
| 2012/0117028 A1 | 5/2012 | Gold et al. | |
| 2012/0204187 A1 | 8/2012 | Breiter et al. | |
| 2012/0254443 A1 | 10/2012 | Ueda | |
| 2013/0174177 A1* | 7/2013 | Newton | H04L 67/148 718/105 |
| 2014/0025796 A1 | 1/2014 | Vibhor et al. | |
| 2014/0089511 A1 | 3/2014 | McLean | |
| 2014/0211698 A1 | 7/2014 | Aguirre et al. | |
| 2014/0297611 A1 | 10/2014 | Abbour et al. | |
| 2014/0304412 A1 | 10/2014 | Prakash et al. | |
| 2014/0331078 A1 | 11/2014 | Cohen | |
| 2014/0337285 A1 | 11/2014 | Gokhale et al. | |
| 2015/0067353 A1* | 3/2015 | Hui | H04L 9/088 713/193 |
| 2015/0067354 A1* | 3/2015 | Hui | G06F 21/602 713/193 |
| 2015/0286519 A1 | 10/2015 | Huang et al. | |
| 2016/0092311 A1 | 3/2016 | Bushman | |
| 2016/0162369 A1 | 6/2016 | Ahn et al. | |
| 2016/0378552 A1 | 12/2016 | Taylor et al. | |
| 2016/0378614 A1 | 12/2016 | Thanasekaran | |
| 2017/0371562 A1 | 12/2017 | Delaney et al. | |

OTHER PUBLICATIONS

"EMC® NetWorker® Module for Microsoft for Exchange Server VSS, Release 8.2, User Guide"; EMC Corporation; 2014 (150 pages).

Slota et al.; "Prediction and Load Balancing System for Distributed Storage"; Scalable Computing: Practice and Experience (SCPE); vol. 11, No. 2; pp. 121-130; 2010.

* cited by examiner

SYSTEM AND METHOD FOR MANAGING WORKLOAD IN A POOLED ENVIRONMENT

BACKGROUND

Computing devices generate, use, and store data. The data may be, for example, images, documents, webpages, or meta-data associated with the data. The data may be stored on a persistent storage. Stored data may be deleted from the persistent storage.

A backup of the data stored on a computing device may be backed up by storing it on a second computing device. The second computing device may be geographically separated from the computing device.

SUMMARY

In one aspect, an orchestrator for assigning clients to storage gateway pools in accordance with one or more embodiments of the invention includes a persistent storage and a processor. The persistent storage includes workload to pool mappings. The processor obtains a data storage request for data from a client of the clients; identifies a workload type associated with the data; selects a storage gateway pool of the storage gateway pools using the identified workload type and the workload to pool mappings; and assigns the selected storage gateway pool to service the data storage request.

In one aspect, a method of operating an orchestrator for assigning clients to storage gateway pools in accordance with one or more embodiments of the invention includes obtaining a data storage request for data from a client of the clients; identifying a workload type associated with the data; selecting a storage gateway pool of the storage gateway pools using the identified workload type and workload to pool mappings; and assigning the selected storage gateway pool to service the data storage request.

In one aspect, a non-transitory computer readable medium in accordance with one or more embodiments of the invention includes computer readable program code, which when executed by a computer processor enables the computer processor to perform a method for assigning clients to storage gateway pools. The method includes obtaining a data storage request for data from a client of the clients; identifying a workload type associated with the data; selecting a storage gateway pool of the storage gateway pools using the identified workload type and workload to pool mappings; and assigning the selected storage gateway pool to service the data storage request.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1A:
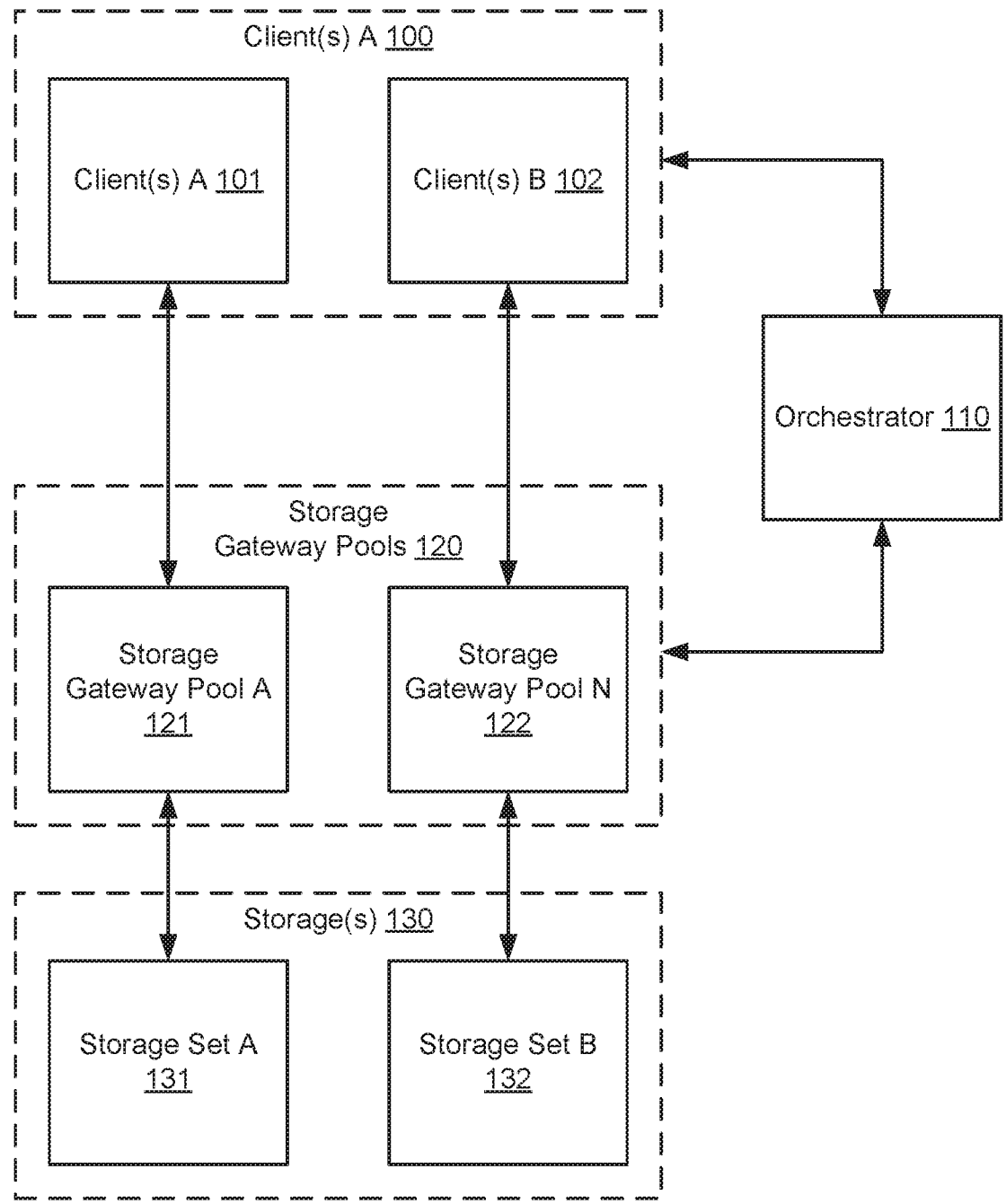
FIG. 1A shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for managing data. More specifically, the systems, devices, and methods may store data from clients in storages. The storages may be remote from the clients. For example, the storages may be operably connected to the clients via a network.

In one or more embodiments of the invention, pools of storage gateways may manage the storage of client data in the storages. The storage gateway pools may act as single points of contact for the clients when the clients request storage of data in the system. The storage gateway pools select a storage for storing of the data from the client. Additionally, the storage gateway pools may manage the retrieval of client data stored in the storages to service stored data access requests from the clients.

In one or more embodiments of the invention, storing data in the storage may consume computing resources. As will be discussed below, the storages may be deduplicated storages and, consequently, consume larger amounts of computing resources under some conditions when storing/providing client data than storages that do not deduplicate data.

As used herein, computing resources refer to processor computing cycles, communication bandwidth, transitory storage input-output cycles, persistent storage input-output cycles, and/or transitory or persistent memory storage capacity. Transitory storage may be provided by, for example, random access memory. Persistent storage memory may be provided by, for example, a solid state hard disk drive. Processor computing cycles may be provided by, for example, a central processing unit. Communication bandwidth may be provided by, for example, a network interface card.

In one or more embodiments of the invention, the system may include an orchestrator. The orchestrator may select a storage gateway pool to service the client storage/access requests. The orchestrator may select a storage gateway pool to service clients to minimize the computing resource cost of servicing the client. In one or more embodiments of the invention, the orchestrator may characterize a workload that the client will impose on a storage gateway pool and assign the client to a storage gateway pool that is servicing clients that impose a similar workload on the storage gateway pool. In other words, clients that impose a similar workload are all assigned to the same storage gateway pool. As will be discussed in greater detail below, assigning clients via the aforementioned method may prevent system conditions that result in the high consumption of computing resources when servicing clients.

The aforementioned result is unexpected because the aggregation of similar workloads in a traditional networked storage system typically results in the over utilization of computing resources during certain periods of time and the under utilization of computing resources during other periods of time. In a traditional system, similar workloads would be spread across the system so that the peak computing resource cost of serving the aforementioned workloads are not imposed on the same pool of storage gateways. Thus, embodiments of the invention may provide a system that assigns clients in a method that is contrary to typical patterns for assignment of workloads to storage gateway pools. The aforementioned method of assignment of clients is unconventional because it has the potential of imposing the peak workload of multiple clients to the same, limited pool of storage gateways.

FIG. 1A shows an example system in accordance with one or more embodiments of the invention. The system may include client(s) (100), storage gateways pools (120) that manage client data, an orchestrator (110) that assigns individual clients (101, 102) to individual storage gateway pools (121, 122), and storages (130) that store the data from the clients (100). The clients (100), storage gateway pools (120), orchestrator (110), and storages (130) may be operably connected to each other. The connection may be, for example, a network connection. Each component of the system is discussed below.

The clients (100) may be computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application. The clients (100) may be other types of computing devices without departing from the invention.

The clients (100) may be programmed to store data in the storages (130) via the storage gateway pools (120). By storing data in the storages, the clients (100) may store backup copies of data and/or reduce the storage utilization rate of the clients.

In one or more embodiments of the invention, the clients (100) store a copy of all or a portion of the respective client's data in the storages (130) via the storage gateway pools (120). In other words, the storage gateway pools (120) may be used to store a copy of the client's data.

In one or more embodiments of the invention, the clients (100) store data in the storages (130) via the storage gateway pools (120). In other words, rather than storing data to a local storage, the clients (100) may store data in the storages (130) via the storage gateway pools (120) without making a local copy of the stored data.

In one or more embodiments of the invention, each client may be assigned to store data in the storages (130) via a single storage gateway pool (121, 122). Each client may receive a respective assignment from the orchestrator (110). After assignment, each client may continue to store data in the storages (130) using the assigned storage gateway.

While the clients (101, 102) are illustrated as being assigned to separate storage gateway pools (120), multiple clients may be assigned to the same storage gateway pool without departing from the invention. For example, storage gateway pool A (121) may have five clients assigned to it and storage gateway pool N (122) may have eight clients assigned to it. However, assigning multiple clients to the same storage gateway may reduce a quality of storage service provided to the clients assigned to the storage gateway pool. For example, the processes of storing or providing data to/from the storages may consume computing resources of the storage gateway pools. As will be discussed in greater detail below, the orchestrator (110) may assign clients to be serviced by different storage gateway pools (120) to minimize the computing resource cost of servicing the clients.

As discussed above, the clients (100) may store data in the storages (130) via the storage gateway pools (120). The storage gateway pools (120) may be pools of storage gateways. The storage gateways may service client storage/access requests.

In one or more embodiments of the invention, the storage gateways of the storage gateway pools (120) are computing devices. The computing devices may be, for example, mobile phones, tablet computers, laptop computers, desktop computers, servers, distributed computing systems, or a cloud resource. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application. The storage gateways of the storage gateway pools (120) may be other types of computing devices without departing from the invention.

In one or more embodiments of the invention, the storage gateways of the storage gateway pools (120) are distributed computing devices. As used herein, a distributed computing device refers to functionality provided by a logical device that utilizes the computing resources of one or more separate and/or distinct computing devices. For example, in one or more embodiments of the invention, the storage gateways of the storage gateway pools (120) may be distributed devices that include components distributed across a number of separate and/or distinct computing devices. In such a scenario, the functionality of the storage gateways of the storage gateway pools (120) may be performed by multiple different computing devices without departing from the invention.

In one or more embodiments of the invention, each of the storage gateways of the storage gateway pools (120) may cooperate with other storage gateways of the respective pool to provide the functionality of the storage gateway pools (120) described throughout this application. In other words, each storage gateway of a respective pool may service data storage/access requests from clients assigned to the respective pool.

In one or more embodiments of the invention, the storage gateway pools (120) manage client data. The storage gateway pools (120) may manage client data by receiving requests to store or obtain data from the clients (100). In response to the requests, the storage gateway pools (120) may take appropriate action to service the aforementioned storage/access requests from the clients. For additional details regarding the storage gateway pools (120), See FIG. 1C.

While the each storage gateway pool (121, 122) of the storage gateway pools (120) are illustrated as being operably connected to separate storage sets (131, 132) of the storages (130), multiple storage gateway pools may be operably connected to any combination of shared and separate storages without departing from the invention. For additional details regarding the connections between storage gateway pools (120) and storage sets (131, 132) of the storages (130), See FIG. 2E.

As discussed above, the storage gateway pools (120) may manage client data by storing it in the storages (130). The storages may include any number of storage sets (131, 132). Each of the storage sets may service data storage/access requests from storage gateway pools.

The storage sets (131, 132) of the storages (130) may be computing devices. The computing devices may be, for example, mobile phones, tablet computers, laptop computers, desktop computers, servers, distributed computing systems, or a cloud resource. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application. The storage sets (131, 132) of the storages (130) may be other types of computing devices without departing from the invention.

In one or more embodiments of the invention, the storage sets (131, 132) of the storages (130) may be distributed computing devices. As used herein, a distributed computing device refers to functionality provided by a logical device that utilizes the computing resources of one or more separate and/or distinct computing devices. For example, in one or more embodiments of the invention, the storage sets (131, 132) of the storages (130) may be distributed devices that include components distributed across a number of separate and/or distinct computing devices. In such a scenario, the functionality of the storage sets (131, 132) of the storages (130) may be performed by multiple different computing devices without departing from the invention.

The storages (130) may store client data or provide previously stored client data. The storages (130) may store or provide client data in response to requests from the storage gateway pools (120). In response to the requests, the storages (130) may take appropriate action to service the aforementioned storage/access requests from the storage gateways. In some embodiments of the invention, the storages (130) may also store data received directly from the clients (100) or provide stored data directly to the clients (100). For example, the storage gateway pools (120) may orchestrate such a scenario to decrease a load on the respective storage gateway pool tasked with servicing a data storage/access request from a client. For additional details regarding the storages (130), See FIG. 1D.

While the storage sets (131, 132) are illustrated as being operably connected to separate storage gateway pools (121, 122), multiple storage sets may be operably connected to any combination of storage gateway pools without departing from the invention. In other words, a storage sets may provide storage services for any number of storage gateway pools.

As discussed above, the storage gateway pools (120) may manage client data. In one or more embodiments of the invention, the orchestrator (110) assigns clients to storage gateway pools (120) to service the assigned clients.

In one or more embodiments of the invention, the orchestrator (110) is a computing device. The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application and the methods illustrated in FIGS. 4A-4B. The orchestrator (110) may be other types of computing devices without departing from the invention.

In one or more embodiments of the invention, the orchestrator (110) is a distributed computing device. For example, the orchestrator (110) may be a distributed device that includes components distributed across a number of separate and/or distinct computing devices. In such a scenario, the functionality of the orchestrator (110) may be performed by multiple different computing devices without departing from the invention.

In one or more embodiments of the invention, the orchestrator (110) assigns clients to be serviced by storage gateway pools (120). The orchestrator (110) may make the assignments to minimize the computing resource cost of servicing the clients. The orchestrator (110) may make the assignments based on a set of rules that take into account one or more of: (i) the workload that assigning the client to a storage gateway pool will impose on the respective storage gateway pool, (ii) the similarity of the workload of (i) to other workloads currently imposed on the respective storage gateway pool, and/or the availability of computing resources of the respective storage gateway pool. The set of rules may take into account additional, different or fewer factors without departing from the invention. For additional details regarding the orchestrator (110), See FIG. 1B.

Figure 1B:
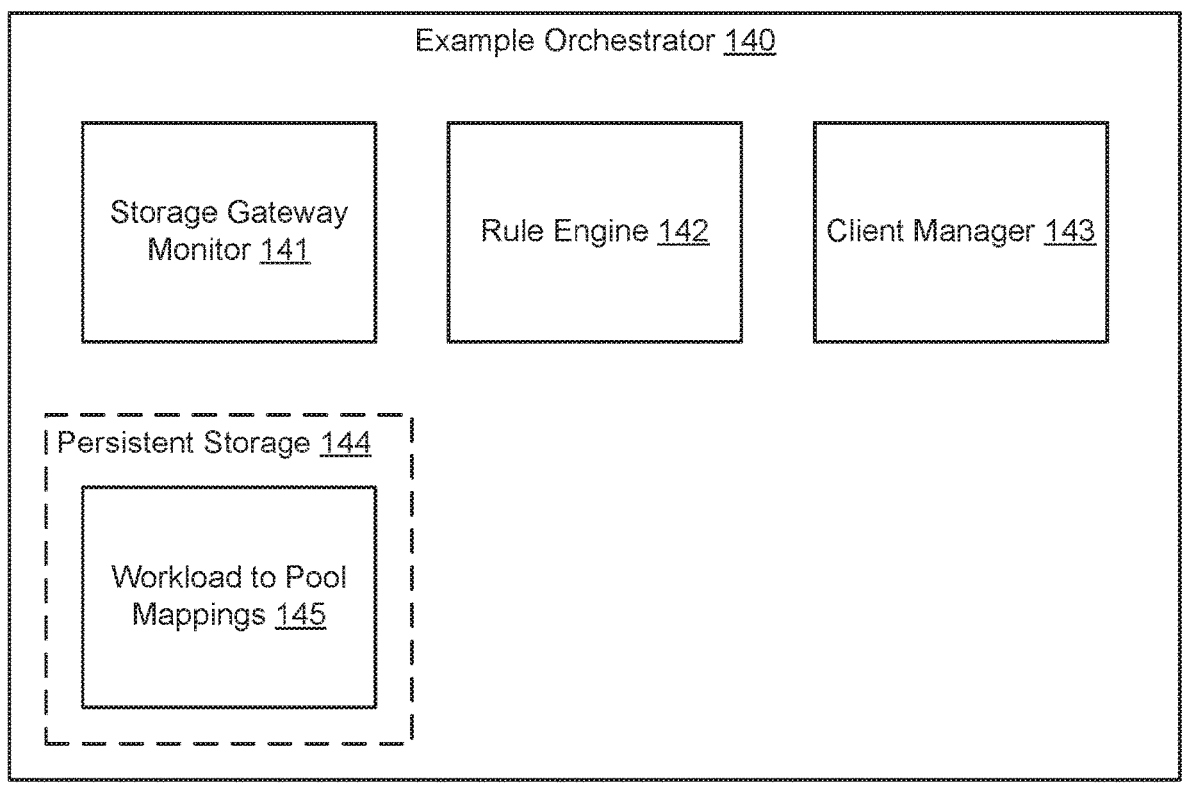
FIG. 1B shows a diagram of an example orchestrator in accordance with one or more embodiments of the invention.
Figure 1C:
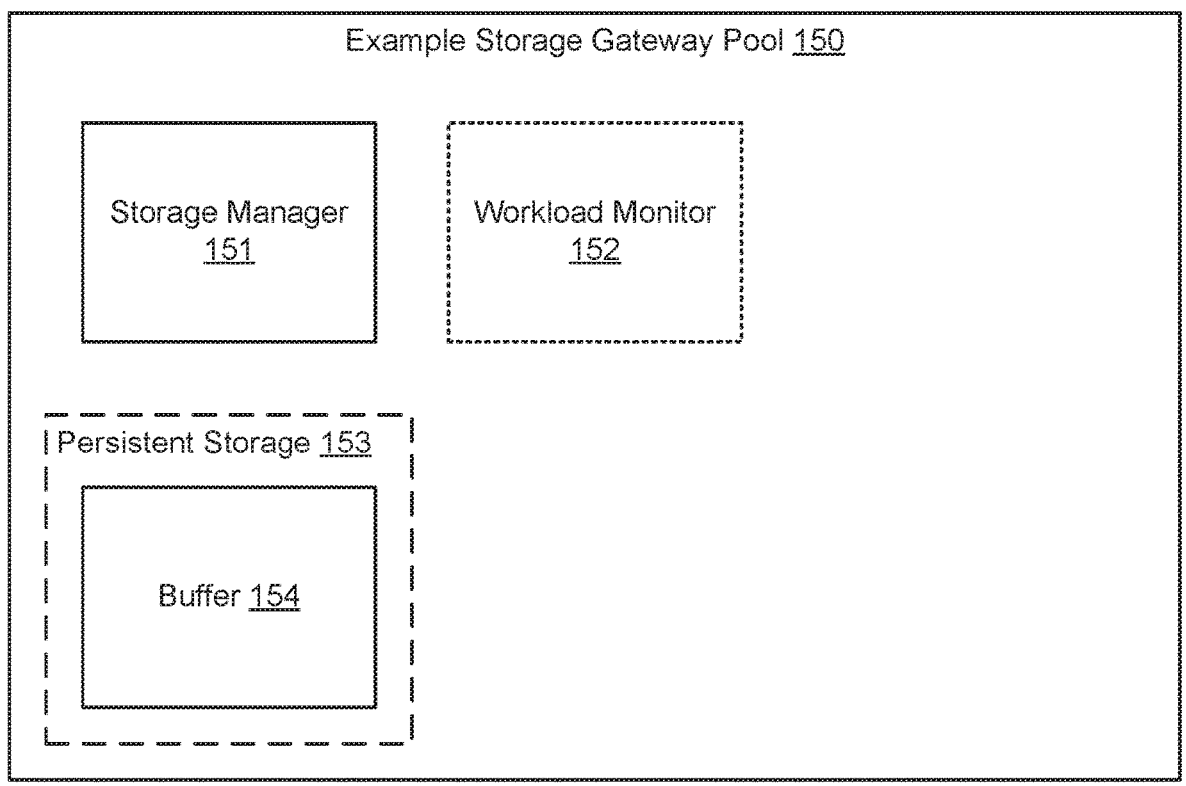
FIG. 1C shows a diagram of an example storage gateway pool in accordance with one or more embodiments of the invention.
Figure 1D:
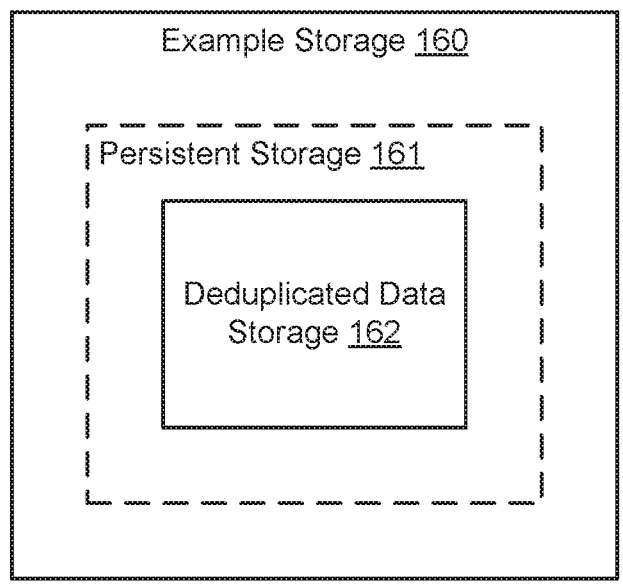
FIG. 1D shows a diagram of an example storage in accordance with one or more embodiments of the invention.

To further explain the operation of components of the system, FIGS. 1B-1D show diagrams of examples of components of the system of FIG. 1A. While these diagrams illustrate portions of the components of the system, each of the components of the system may include additional, fewer, or different portions without departing from the invention.

FIG. 1B shows an example orchestrator (140) in accordance with one or more embodiments of the invention. The example orchestrator (140) may provide the same functionality as the orchestrator (110, FIG. 1A) illustrated in FIG. 1A. As described with respect to FIG. 1A, the example orchestrator (140) may assign clients to storage gateway pools. To provide the aforementioned functionality, in one or more embodiments of the invention the example orchestrator (140) includes a storage gateway pool monitor (141), a rule engine (142), a client manager (143), and a persistent storage (144). Each component of the example orchestrator (140) is described below.

In one or more embodiments of the invention, the storage gateway pool monitor (141) obtains storage gateway pool operational metrics and aggregates the aforementioned metrics. The aggregated metrics may be stored on the persistent storage (144). The storage gateway pool operation metrics may include a utilization rate of the computing resources of the storage gateway pool. As will be discussed in greater detail below, the rule engine (142) may utilize the aggregated metrics when assisting the client manager (143) in making client assignments. Additionally, in some embodiments of the invention, the operation metrics may be used to determine when the computing resources of the respective storage gateway pools should be modified. The computing resources of the respective storage gateway pools may be modified by adding or removing storage gateways from the respective storage gateway pool.

In one or more embodiments of the invention, the storage gateway pool monitor (141) is implemented as a circuit. For example, storage gateway pool monitor (141) may be implemented as a field programmable gate array, application integrated circuit, digital signal processor, or analog circuit. The storage gateway pool monitor (141) may be implemented as other types of circuit without departing from the invention.

In one or more embodiments of the invention, the storage gateway pool monitor (141) is implemented as computer readable instructions stored on a non-transitory computer readable storage medium being executed by a processor. The computer readable instructions may cause the processor to perform the aforementioned functions of the storage gateway pool monitor (141).

The rule engine (142) may assist the client manager (143) in assigning clients to storage gateways. As discussed above, assigning clients to different storage gateway pools may use different quantities of computing resources by the respective storage gateway pools to service the client. To improve the efficiency of storage gateway pools, the client manager (143) may request that the rule engine (142) make a determination regarding which storage gateway pool the client should be assigned.

In one or more embodiments of the invention, the rule engine (142) makes a determination based on a set of rules. The set of rules may specify a determination based on one or more of the following: (i) the type of workload the particular client will impose a storage gateway pool, (ii) the types of workloads currently imposed on each storage gateway pool by the clients which each respective storage gateway pool is servicing, and (iii) the unused computing resources available to each storage gateway pool. In one or more embodiments of the invention, the rule engine (142) performs all or a portion of the methods illustrated in FIGS. 4A-4B when making a determination regarding assignment of a client. The determination may specify the storage gateway pool to which the client is to be assigned. In one or more embodiments of the invention, the rule engine (142) may make a determination based on workload to pool mappings (145). For additional details regarding workload to pool mappings, See FIG. 2A.

In one or more embodiments of the invention, the type of workload the client will impose specifies a classification of the files that the client will be storing via the storage gateway. The classification may be one or more of the following: (a) a database type, e.g., Oracle database, SQL database, etc., (b) an application currently being executed by the client, e.g., a database query engine, a file server, etc., and (c) an operating system used by the client. The classification may be classified based on additional categories without departing from the invention.

In one or more embodiments of the invention, the types of workloads currently imposed on each storage gateway pool by the clients which each respective storage gateway pool is servicing may be a granular characterization of the workloads imposed on the respective storage gateway pools. Each client may impose multiple workloads on respective storage gateway pools servicing the clients. For example, a client may be both running a database and generating text documents. Storing copies of the data based and text documents may impose separate workloads on the storage gateway pools. Thus, the type of workloads currently imposed on a storage gateway pool may include a characterization of each imposed workload.

In one or more embodiments of the invention, the types of workloads currently imposed on each storage gateway pool by the clients may be the most frequently service workload by the client. As noted above, each client may impose multiple workloads on respective storage gateway pools servicing the clients. However, one workload is the most frequently service by the respective storage gateway pool. Thus, the type of workloads currently imposed on a storage gateway pool may only be a characterization of the workload most frequently imposed on the respective storage gateway pools by the clients the respective storage gateways are serving.

In one or more embodiments of the invention, the characterization of the workload imposed on the respective storage gateway pools may specify an application most frequently executed, e.g., that consumes the most computing resources of the clients, by clients assigned to the respective storage gateway pools for service. For example, the application may be a database engine, a file server, a multi media generation program, a business application, or any other type of executable program.

In one or more embodiments of the invention, the rule engine (142) is implemented as a circuit. For example, rule engine (142) may be implemented as a field programmable gate array, application integrated circuit, digital signal processor, or analog circuit. The rule engine (142) may be implemented as other types of circuit without departing from the invention.

In one or more embodiments of the invention, the rule engine (142) is implemented as computer readable instructions stored on a non-transitory computer readable storage medium being executed by a processor. The computer readable instructions may cause the processor to perform the aforementioned functions of the rule engine (142).

As discussed above, the client manager (143) may assign clients to storage gateways using determinations made by the rule engine (142). When a client attempts to store data via a storage gateway pool, the client may first notify the client manager (143) of the storage request. In response, the client manager (143) may request a determination from the rule engine (142) regarding a potential assignment, e.g., potentially assigning the client to a particular storage gateway pool. In response to the request, the rule engine (142) provides the client manager (143) with a determination. The client manager (143) may assign the client to the storage gateway pool that will service the client.

In one or more embodiments of the invention, the client manager (143) is implemented as a circuit. For example, client manager (143) may be implemented as a field programmable gate array, application integrated circuit, digital signal processor, or analog circuit. The client manager (143) may be implemented as other types of circuit without departing from the invention.

In one or more embodiments of the invention, the client manager (143) is implemented as computer readable instructions stored on a non-transitory computer readable storage medium being executed by a processor. The computer readable instructions may cause the processor to perform the aforementioned functions of the client manager (143).

As discussed above, the storage gateway pool monitor (141) and rule engine (142) may utilize data structures stored in a persistent storage (144). In one or more embodiments of the invention, the persistent storage (144) is a physical device. The physical device may be, for example, a solid state hard drive, a disk drive, a tape drive, or other non-transitory storage medium. In some embodiments of the invention, the persistent storage (144) is a logical device that utilizes the physical computing resources of one or more other devices to provide data storage functionality. For example, the persistent storage (144) may be a logical storage that utilizes the physical storage capacity of disk drives of multiple, separate computing devices.

The persistent storage (144) may workload to pool mappings (145). The persistent storage (144) may store additional, different, or less data without departing from the invention.

In one or more embodiments of the invention, the workload to pool mappings (145) is a data structure stored in the persistent storage (144). The data structure may include regarding the assignment of clients to pools based on the workloads that the clients will impose. In other words, workload to pool mappings (145) may specify to which respective storage gateway pool clients performing respective workloads are to be assigned. For additional details regarding the workload to pool mappings (145), See FIG. 2A.

FIG. 1C shows a diagram of an example storage gateway pool (150) in accordance with one or more embodiments of the invention. The example storage gateway pool (150) may be an example of the storage gateway pools (121, 122, FIG. 1A) shown in FIG. 1A. To provide the functionality of the storage gateway pools (121, 122, FIG. 1A) shown in FIG. 1A, in one or more embodiments of the invention the example storage gateway pool (150) includes a storage manager (151), a workload monitor (152), and a persistent storage (153). In some embodiments of the invention, the workload monitor (152) is implemented separately from the example storage gateway pool (150). Each component of the example storage gateway pool (150) is discussed below.

In one or more embodiments of the invention, the storage manager (151) services data storage/access requests from clients. As shown in FIG. 1C, the storage manager (151) represents the functionality provided by the storage gateways of the storage gateway pools. Thus, each of the storage gateway of the example storage gateway pool (150) may be providing storage services to client. To service the requests, the storage manager (151) may store data in a buffer (154) implemented in a persistent storage (153) and/or other storages that are operably connected to the storage manager (151). Similarly, the storage manager (151) may retrieve data from the buffer (154) and/or the storages that are operably connected to the storages. In one or more embodiments of the invention, the other storages are separate, e.g., part of a different device, from the example storage gateway pool (150).

In one or more embodiments of the invention, the buffer (154) may store copies of a portion of the client data stored in the storages. The storage manager (151) may preferentially retrieve copies of client data stored in the buffer (154) when servicing client request rather than retrieving copies of the client data stored in the storages.

In one or more embodiments of the invention, the storage manager (151) is implemented as a circuit. For example, the storage manager (151) may be implemented as a field programmable gate array, application integrated circuit, digital signal processor, or analog circuit. The storage manager (151) may be implemented as other types of circuit without departing from the invention.

In one or more embodiments of the invention, the storage manager (151) is implemented as computer readable instructions stored on a non-transitory computer readable storage medium being executed by a processor. The computer readable instructions may cause the processor to perform the aforementioned functions of the storage manager (151).

In one or more embodiments of the invention, the workload monitor (152) monitors the workload of the example storage gateway pool (150). More specifically, the workload monitor (152) may monitor the available computing resources of the example storage gateway pool (150) and provide the monitored available computing resources to the orchestrator. The workload monitor (152) may perform the monitoring continuously, periodically, at any schedule of fixed time intervals, and/or in response to requests from the orchestrator. The monitoring may be performed using different scheduling scenarios without departing from the invention.

In one or more embodiments of the invention, the workload monitor (152) is implemented as a circuit. For example, the workload monitor (152) may be implemented as a field programmable gate array, application integrated circuit, digital signal processor, or analog circuit. The workload monitor (152) may be implemented as other types of circuit without departing from the invention.

In one or more embodiments of the invention, the workload monitor (152) is implemented as computer readable instructions stored on a non-transitory computer readable storage medium being executed by a processor. The computer readable instructions may cause the processor to perform the aforementioned functions of the workload monitor (152).

In one or more embodiments of the invention, the persistent storage (153) is a physical device. The physical device may be, for example, a solid state hard drive, a disk drive, a tape drive, or other non-transitory storage medium. In some embodiments of the invention, the persistent storage (153) may be a logical device that utilizes the physical computing resources of one or more other devices to provide data storage functionality. For example, the persistent storage (153) may be a logical storage that utilizes the physical storage capacity of disk drives of multiple, separate computing devices.

In one or more embodiments of the invention, the persistent storage (153) stores the buffer (154). The persistent storage (153) may store additional, different, or less data without departing from the invention.

In one or more embodiments of the invention, the buffer (154) is a data structure stored in the persistent storage (153). The data structure may include copies of client data stored in the storages. In some cases, client data may be first stored in the buffer (154) and copies of the client data may be subsequently stored in the storages. Portions of the client data in the buffer may be deleted and thereby result in a copy of only a portion of a client's data stored in the storages being maintained in the buffer (154).

Figure 1E:
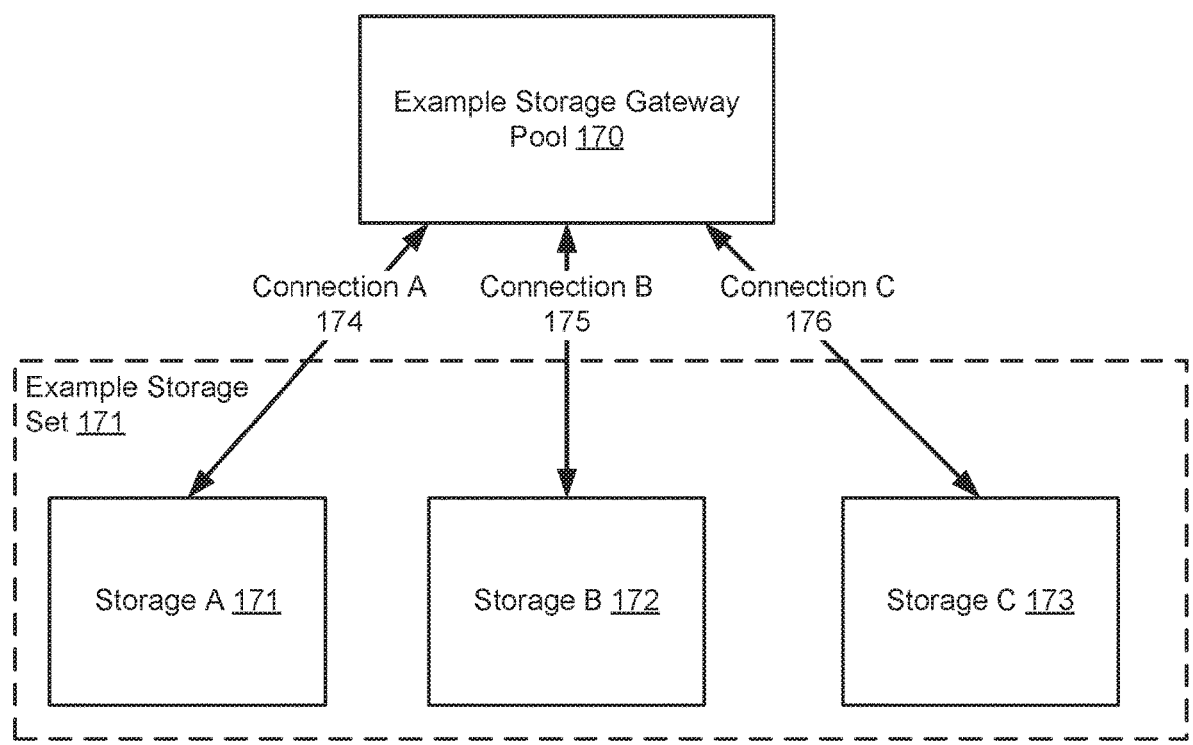
FIG. 1E shows a diagram of an example topology of a storage gateway pool and storages in accordance with one or more embodiments of the invention.

As discussed above, to service client storage/access requests the storage gateway pools may utilize storages. The storages may be separate devices operably connected to the storage gateway pools. Each storage gateway pool may be connected to any number of storages. FIG. 1E shows an example of storage gateway pool and storage topology.

FIG. 1E shows a diagram of a first example storage topology. The first example storage topology includes an example storage gateway pool (170) operably connected to a storage set (171). The example storage gateway pool (170) is operably connected to storages (172, 173, 174) of the storage set through respective operable connections (175, 176, 177).

As discussed above, storage gateway pools may utilizes storages to provide clients with data storage/access services. FIG. 1D shows an example storage (160) in accordance with one or more embodiments of the invention. The example storage (160) may store data from storage gateways or provide stored data to storage gateways in response to requests from the storage gateways.

In one or more embodiments of the invention, the example storage (160) includes a persistent storage (161). The persistent storage (161) may be a physical device. The physical device may be, for example, a solid state hard drive, a disk drive, a tape drive, or other non-transitory storage medium. In some embodiments of the invention, the persistent storage (161) may be a logical device that utilizes the physical computing resources of one or more other devices to provide data storage functionality. For example, the persistent storage (161) may be a logical storage that utilizes the physical storage capacity of disk drives of multiple, separate computing devices.

In one or more embodiments of the invention, the persistent storage (161) stores a deduplicated data storage (162). The deduplicated data storage (162) may be a data structure for storing client data. In other words, the example storage (160) may store client data in the deduplicated data storage (162).

As used herein, a deduplicated storage refers to a storage that attempts to reduce the required amount of storage space to store data by not storing multiple copies of the same files or bit patterns located near the storage location of the data within a storage when the data is first stored in the storage. A deduplicated storage balances the input-output (10) limits of the physical devices used to implement the storage stored against the benefit of reduced storage space requirements by only comparing the to-be-stored data to a portion of all of the data stored in the object storage.

To deduplicate data, the to-be-stored data may be broken down into segments. The segments may correspond to portions of the to-be-stored data. Fingerprints that identify each segment of the to-be-stored data may be generated. The generated fingerprints may be compared to a portion of pre-existing fingerprints associated with a portion of the data already stored in the storage. Any segments of the to-be-stored data that do not match a fingerprint of the portion of the data already stored in the storage may be stored in the storage; the other segments are not stored in the storage. A file recipe to generate the now-stored data may be generated and stored so that the now-stored data may be retrieved from the storage. The recipe may include information that enables all of the segments of the to-be-stored data that were stored in the storage and all of the segments of the data already stored in the object storage having fingerprints that matched the fingerprints of the segments of the to-be-stored data to be retrieved from the object storage.

As used herein, a fingerprint may be a bit sequence that virtually uniquely identifies a segment. As used herein, virtually uniquely means that the probability of collision between each fingerprint of two segments that include different data is negligible compared to the probability of other unavoidable causes of fatal errors. In one or more embodiments of the invention, the probability is $10^\wedge$-20 or less. In one or more embodiments of the invention, the unavoidable fatal error may be caused by a force of nature such as, for example, a tornado. In other words, the fingerprint of any two segments that specify different data will virtually always be different.

In one or more embodiments of the invention, a fingerprint of a bit sequence is generated by obtaining a hash of the bit sequence. The hash may be generated using, for example, secure hashing algorithm (SHA) 1. Other hashing algorithms may be used without departing from the invention.

The process of deduplication of data, discussed above, utilizes computing resources including processing cycles, storage IO, and/or network communications bandwidth. Additionally, the deduplication factor, i.e., the reduction in storage space for storing data in a deduplicated storage vs. a non-deduplicated storage, depends on both the type of data to be stored and the existing data stored in the deduplicated storage. Embodiments of the invention may improve the deduplication rate by assigning clients that are likely to store similar data to the same storage gateway pool which, in turn, stores the similar data in the same storage. By doing so, one or more embodiments invention provide an improved storage system in a network environment that provides a higher deduplication factor.

In contrast, contemporary storage systems in a network environment attempt to spread the computing resource load for storing data by assigning clients performing similar workloads to different storage gateway pools. While doing so spreads the computing resource load for performing deduplication, it increases the total computing resource load for storing data by reducing the deduplication factor of the respective storages storing data from the respective clients. Generally, high deduplication factors decrease the computing resource load of storing data by reducing the number of storage input-output cycles, processing cycles, and/or memory use for storing data.

Figure 2A:
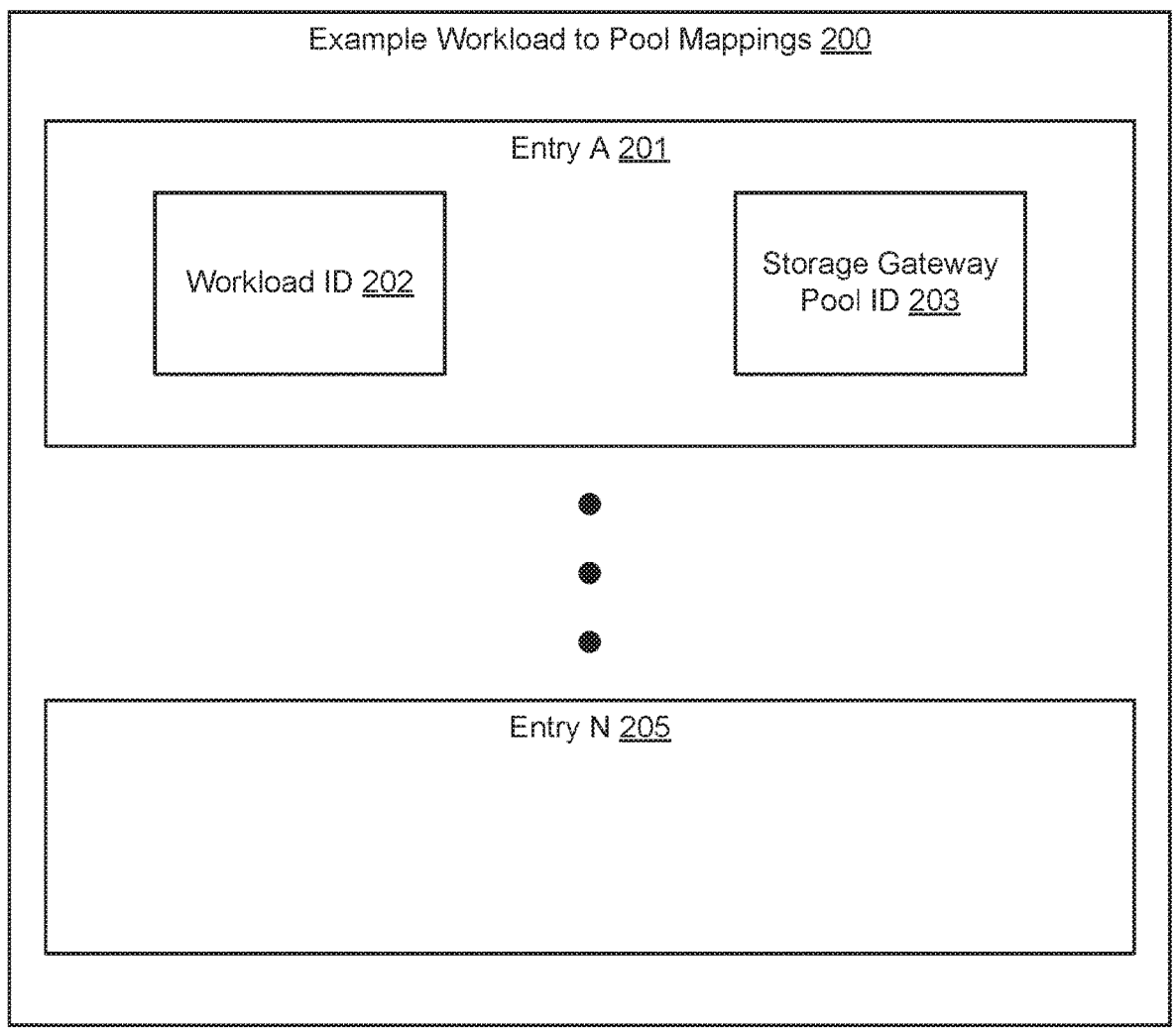
FIG. 2A shows a diagram of an example of workload to pool mappings in accordance with one or more embodiments of the invention.

To further clarify embodiments of the invention, a diagram of a data structure used by the system shown in FIG. 1A is illustrated in FIG. 2A.

FIG. 2A shows a diagram of example workload to pool mappings (200) in accordance with one or more embodiments of the invention. The aforementioned mappings may be utilized by an orchestrator when assigning clients to storage gateway pools.

The example to pool mappings (200) associate workloads with storage gateway pools. Each entry (201, 205) may include a workload identifier (202) and a storage gateway pool identifier (203). The workload identifier (202) may indicate workloads at any level of granularity. The storage gateway pool identifier (203) may by an identifier of a storage gateway pool. Thus, each entry may map workloads of clients to different storage gateway pools.

In some embodiments of the invention, multiple entries may map different workloads to the same storage gateway pool. For example, the workloads associated with each of the entries may be similar and, therefore, assigning the same storage gateway pool to service clients performing the various workloads may be warranted.

While the data structure illustrated in FIG. 2A is shown as a list of entries, the data structure may be stored in other formats, may be divided into multiple data structures, and/or portion of the data structure may be distributed across multiple computing devices without departing from the invention.

Figure 3:
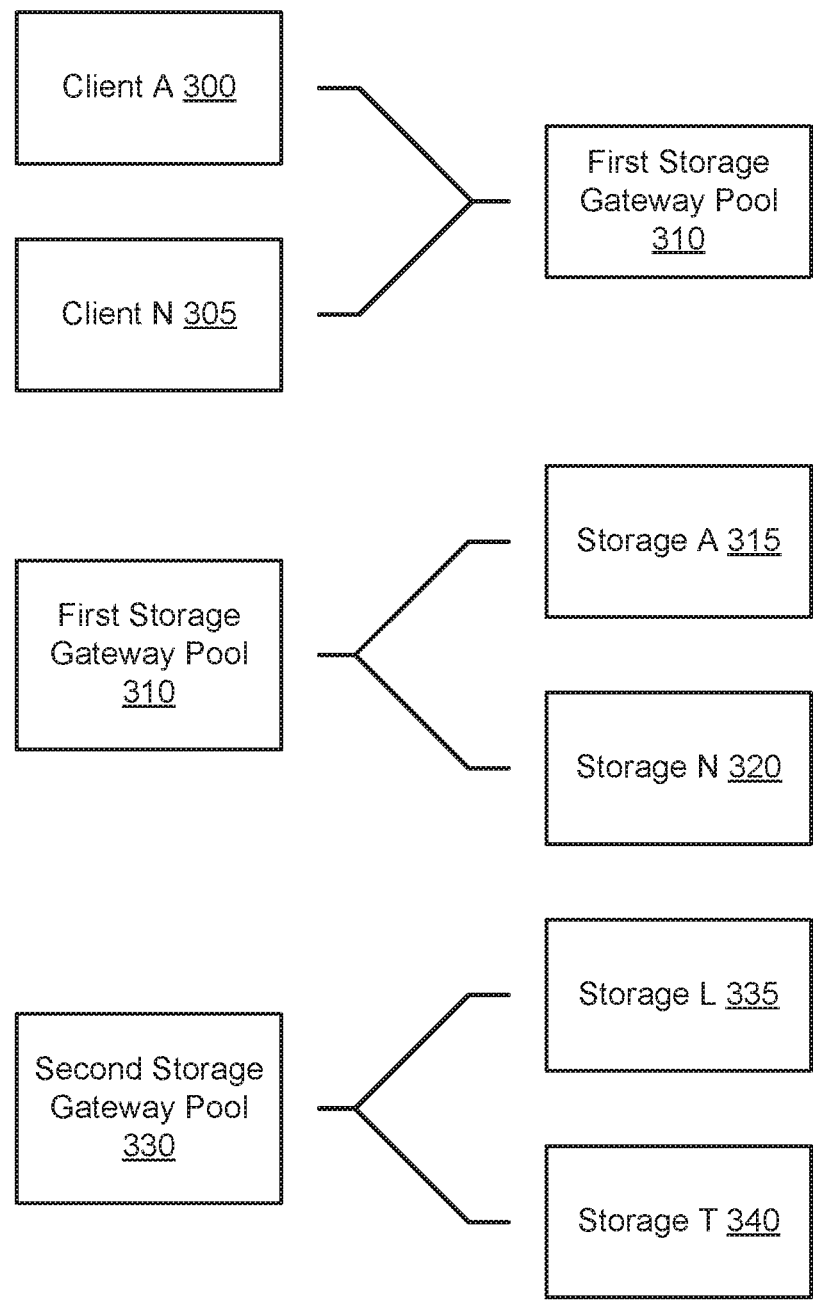
FIG. 3 shows a diagram of system relationships in accordance with one or more embodiments of the invention.

To further clarify relationships between components of the system of FIG. 1A, FIG. 3 shows a relationship diagram. As seen from the diagram, any number of clients (300, 305) may be assigned to be served by a storage gateway pool (310), e.g., an N to one relationship. Similarly, a first storage gateway pool (310) may utilize any number of storages (315, 320), e.g., a one to N relationship. Further, a second storage gateway pool (330) may utilize overlapping groups of storages (335, 335) that are partially utilized by a first storage gateway pool (310).

Figure 4A:
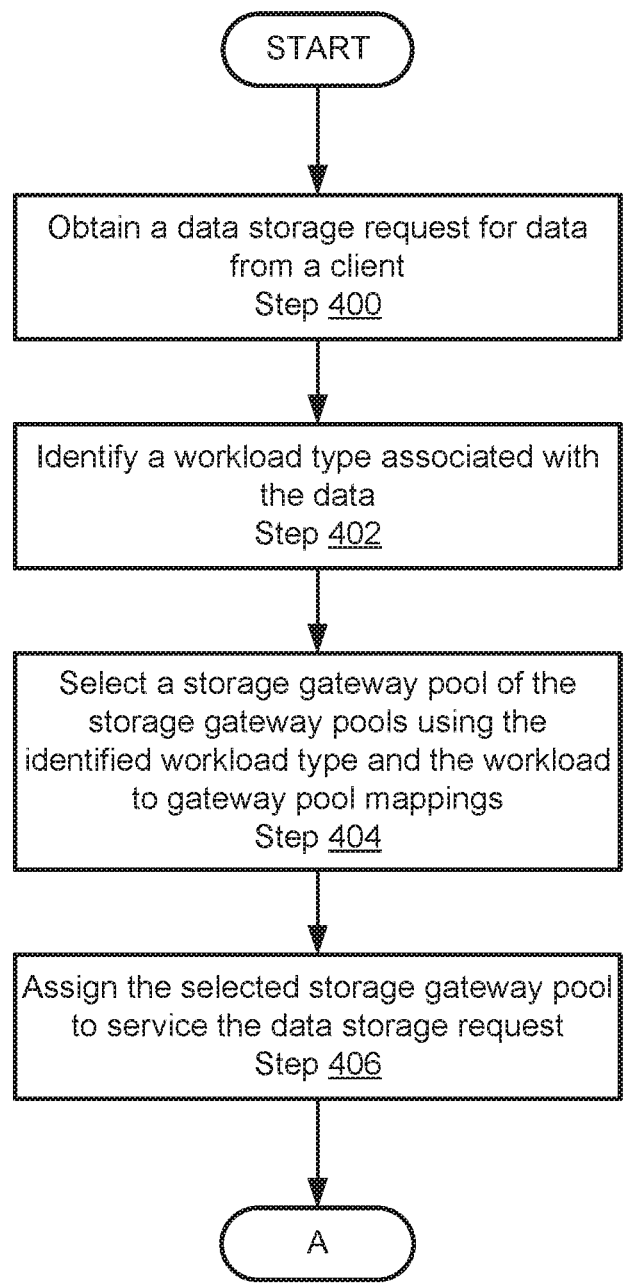
FIG. 4A shows a flowchart of a method of assigning clients to be serviced by storage gateway pools in accordance with one or more embodiments of the invention.
Figure 4B:
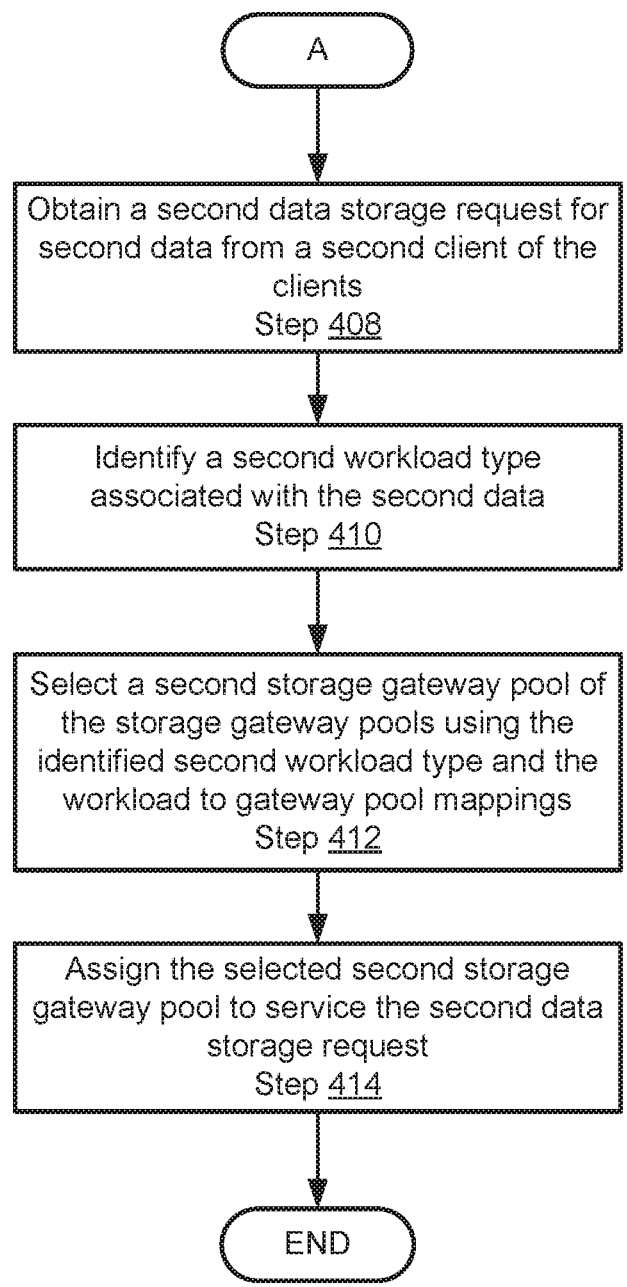
FIG. 4B shows a continuation of the flowchart of FIG. 4A.

As discussed above, the orchestrator (110, FIG. 1A) may assign clients to storage gateway pools (120). FIGS. 4A-4B show methods in accordance with one or more embodiments of the invention to perform the assignments. More specifically, FIGS. 4A and 4B may shows portions of the same method. One of ordinary skill will appreciate that some or all of these steps of the method illustrated in FIGS. 4A-4B may be executed in different orders, may be combined or omitted, and some or all of the steps may be executed in parallel.

FIG. 4A shows a flowchart of a method in accordance with one or more embodiments of the invention. The method depicted in FIG. 4A may be used to assign clients to storage gateway pools in accordance with one or more embodiments of the invention. The method shown in FIG. 4A may be performed by, for example, an orchestrator (110, FIG. 1A). Other component of the system illustrated in FIG. 1A may perform the method of FIG. 4A without departing from the invention.

In Step 400, a data storage request for data is obtained from a client.

In one or more embodiments of the invention, the data storage request is obtained directly from the client.

In one or more embodiments of the invention, the data storage request is obtained indirectly from the client. For example, the data storage request may be sent to a storage gateway pool which forwards the data storage request to the orchestrator.

In one or more embodiments of the invention, the data is any type of data. For example, the data may be a database, a text document, an audio file, a video file, or any other type of data. Further, the data may include any quantity of data.

In Step 402, a workload type associated with the data is identified.

In one or more embodiments of the invention, the workload type is identified based on the type of the data from the client. The type of the data may indicate the workload type. For example, if the data includes a database entry the type of the data may indicate a database workload.

In one or more embodiments of the invention, the workload type is identified by querying the client. The query may request an identity of the program used to generate the data. The identity of the program may indicate the workload type. For example, if the data was generated by a video editing application the identity of the application may indicate a video processing workload.

The workload type may be identified using other methods without departing from the invention.

In Step 404, a storage gateway pool of storage gateway pools is selected using the identified workload type and workload to pool mappings associated with the storage gateway pools.

In one or more embodiments of the invention, the selection is performed by matching the identified workload type to an entry of the workload to pool mappings associated with the identified workload type. For example, as discussed with respect to FIG. 2A, the workload to pool mappings may associate different workload types to storage gateway pools. Thus, all clients having the identified workload type may be assigned to the same storage gateway pool.

In one or more embodiments of the invention, the storage gateway pool is selected while a second storage gateway pool has a lower workload than the selected storage gateway pool. As discussed above, embodiments of the invention may assign clients to storage gateway pools that have a higher workload than other storage gateway pools to increase a deduplication factor of the storages utilized be each of the respective storage gateway pools.

In Step 406, the selected storage gateway pool is assigned to service the data storage request.

Following Step 406, the method proceeds to box A in FIG. 4B

FIG. 4B shows a continuation of the flowchart of the method of FIG. 4A in accordance with one or more embodiments of the invention.

In Step 408, a second data storage request for second data from a second client is obtained.

In one or more embodiments of the invention, the second data storage request is obtained directly from the second client.

In one or more embodiments of the invention, the second data storage request is obtained indirectly from the second client. For example, the second data storage request may be sent to a storage gateway pool which forwards the second data storage request to the orchestrator.

In one or more embodiments of the invention, the second data is any type of data. For example, the data may be a database, a text document, an audio file, a video file, or any other type of data. Further, the second data may include any quantity of data.

In Step 410, a second workload type associated with the second data is identified.

In one or more embodiments of the invention, the second workload type is identified based on the type of the second data from the second client. The type of the second data may indicate the workload type. For example, if the second data includes a database entry the type of the second data may indicate a database workload.

In one or more embodiments of the invention, the workload type is identified by querying the second client. The query may request an identity of the program used to generate the second data. The identity of the program may indicate the workload type. For example, if the second data was generated by a video editing application the identity of the application may indicate a video processing workload.

The workload type may be identified using other methods without departing from the invention.

In Step 412, a second storage gateway pool is selected using the second identified workload type and the workload to pool mappings.

In one or more embodiments of the invention, the selection is performed by matching the second identified workload type to a second entry of the workload to pool mappings associated with the identified second workload type. For example, as discussed with respect to FIG. 2A, the workload to pool mappings may associate different workload types to storage gateway pools. Thus, all clients having the identified second workload type may be assigned to the same storage gateway pool but different from the storage gateway pool assigned to service the first client.

In one or more embodiments of the invention, the second storage gateway pool is selected while the storage gateway pool servicing the first client has a lower workload than the selected second storage gateway pool. As discussed above, embodiments of the invention may assign clients to storage gateway pools that have a higher workload than other storage gateway pools to increase a deduplication factor of the storages utilized be each of the respective storage gateway pools.

In Step 414, the selected storage gateway pool is assigned to service the second data storage request.

The method may end following Step 414.

To further explain embodiments of the invention, a non-limiting example is shown in FIGS. 5A-5D.

Example 1

Figure 5A:
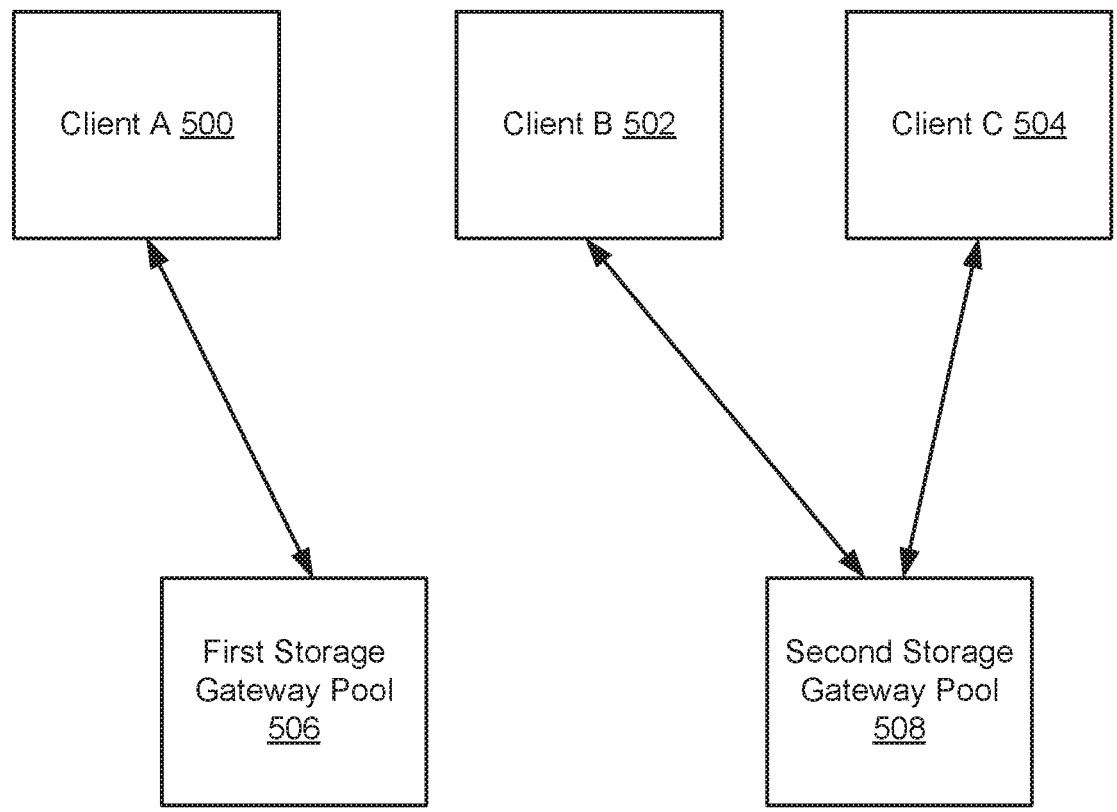
FIG. 5A shows a diagram of an example system.

FIG. 5A shows a diagram of an example system. The system includes clients (500, 502, 504) being serviced by storage gateway pools (506, 508). More specifically, client A (500) is being serviced by a first storage gateway pool (506) and clients B and C (502, 504) are being serviced by a second storage gateway pool (508).

Figure 5B:
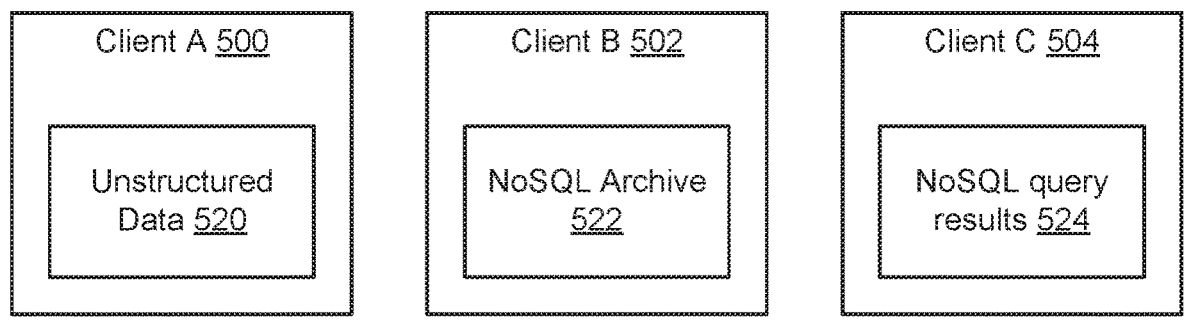
FIG. 5B shows a diagram of the client data of the example system of FIG. 5A.

When the clients (500, 502, 504) initially requested to store data in the system, an orchestrator (not shown) compared a workload that each client would impose on the storage gateway pools. FIG. 5B shows a diagram of the clients and the respective data that each respective client indicated that it desired to store. As seen from FIG. 5B client A (500) indicated that it intended to store unstructured data (520), client B (502) indicated that it intended to store a NoSQL archive (522), and client C (504) indicated that it intended to store NoSQL query results (524).

Figure 5C:
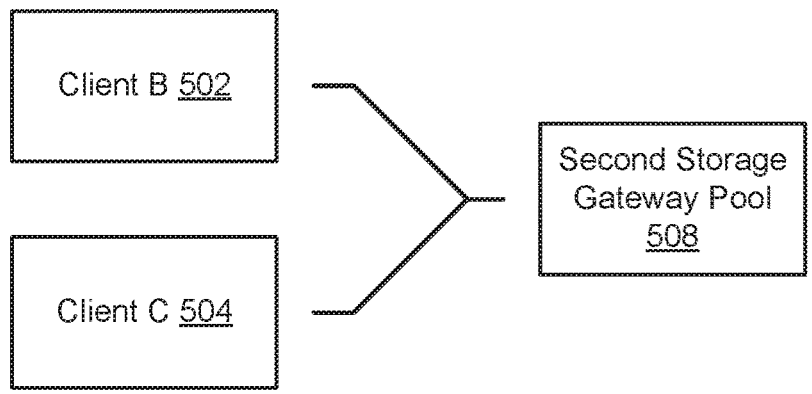
FIG. 5C shows a diagram of a first portion of the assignments of clients to storage gateway pools of the example system of FIG. 5A.
Figure 5D:
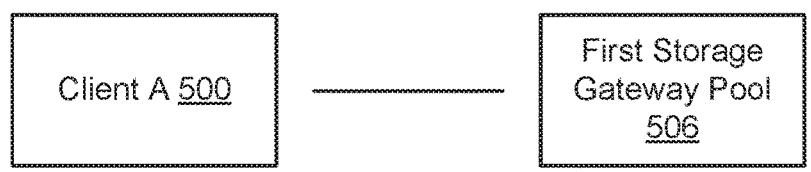
FIG. 5D shows a diagram of a second of the assignments of clients to storage gateway pools of the example system of FIG. 5A.

Based on the data type of the data each client intended to store, the orchestrator assigned clients B and C (502, 504) to be serviced by second storage gateway pool (508) as indicated by the relationship diagram shown in FIG. 5C. In contrast, the orchestrator assigned client A (500) to be serviced by the first storage gateway pool (506).

The orchestrator made the aforementioned assignments based on the similarity of the workloads of clients B and C (502, 504) indicated by the data type of the data included in the data storage requests. By doing so, the deduplication factor of the second storage gateway pool (508) is made larger when compared to the deduplication factor of the second storage gateway pool (508) if only client B (502) or client C (504) were assigned to the second storage gateway pool (508).

The orchestrator assigned client A (500) to the first storage gateway pool (506) because the data type of the data included in the data storage request was different from that of the data type of the data included in the data storage request of clients B and C (502, 504).

Example 1 ends here.

Figure 6:
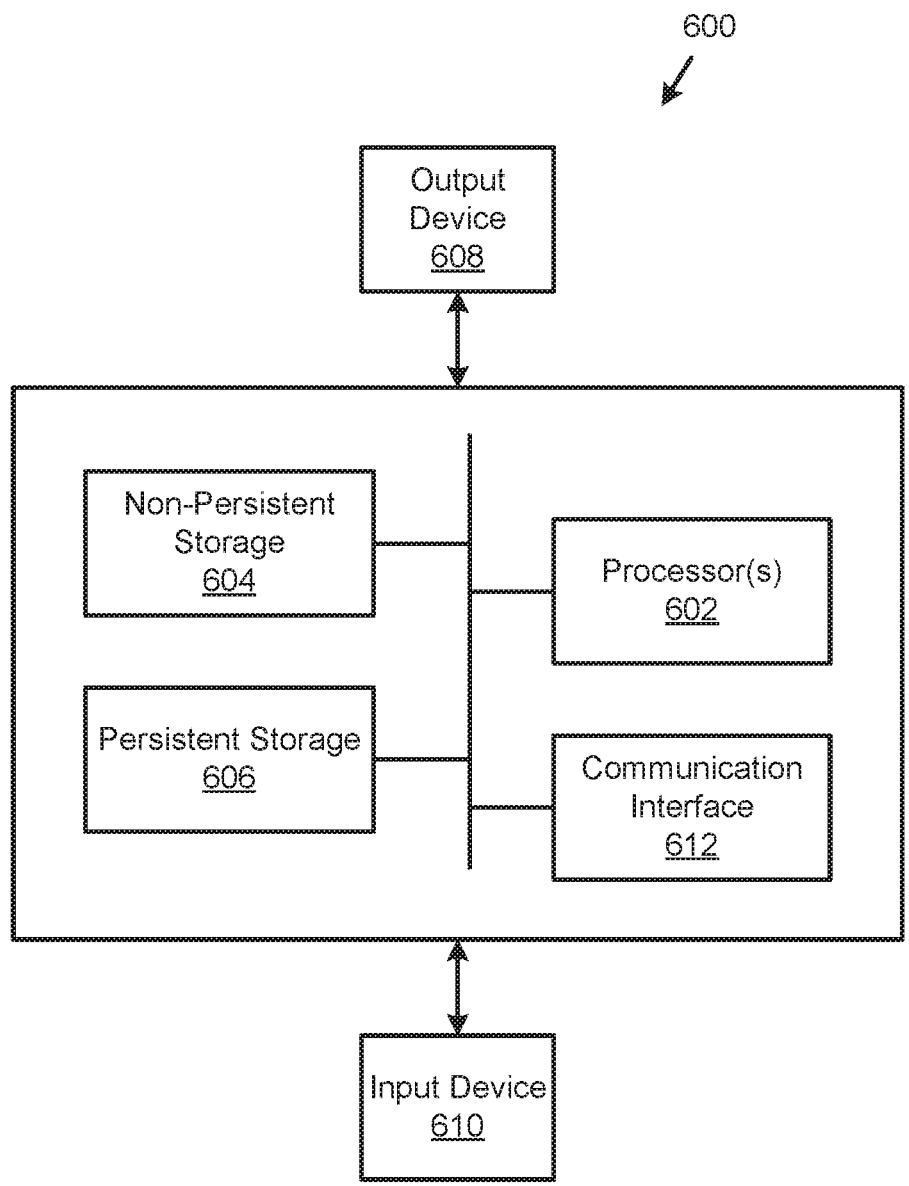
FIG. 6 shows a diagram of a computing device in accordance with one or more embodiments of the invention.

As discussed above, embodiments of the invention may be implemented using computing devices. FIG. 6 shows a diagram of a computing device in accordance with one or more embodiments of the invention. The computing device (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), input devices (610), output devices (608), and numerous other elements (not shown) and functionalities. Each of these components is described below.

In one embodiment of the invention, the computer processor(s) (602) may be an integrated circuit for processing instructions. For example, the computer processor(s) may be one or more cores or micro-cores of a processor. The computing device (600) may also include one or more input devices (610), such as a touchscreen, keyboard, mouse, microphone, touchpad, electronic pen, or any other type of input device. Further, the communication interface (612) may include an integrated circuit for connecting the computing device (600) to a network (not shown) (e.g., a local area network (LAN), a wide area network (WAN) such as the Internet, mobile network, or any other type of network) and/or to another device, such as another computing device.

In one embodiment of the invention, the computing device (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may address the problem of managing data in a networked environment. In a networked environment, client data may be stored in a range of storages. Storing the client data in various deduplicated storages impose different computing resource usage loads on the system. For example, storing client data in a deduplicated storage that stores data that is dissimilar to the client data may impose a high computing resource load. Embodiments of the invention may decrease a computing resource cost of storing client data by assigning all clients that have a particular workload to be serviced by a particular storage gateway pool. Doing so increases the deduplication factor for storing the data by increasing the likelihood that each of the clients assigned to be serviced by the storage gateway pool will store similar data via the storage gateway pool. Thus, embodiments of the invention may improve data storage in a network environment by increasing the deduplication factor of stored data.

This approach result in an atypical assignment of clients to storage gateway pools when compared to contemporary network storage systems that attempt to spread the load of storing data by assigning clients performing similar workloads to different storage gateway pools. In particular, when clients are assigned to storage gateway pools the client may be assigned to a storage gateway pool that is under a heavier load then other storage gateway pools. As used here, the load on a storage gateway pool may be the number, i.e., the cardinality, of clients assigned to receive storage services from the storage gateway pool. Thus, embodiments of the invention may provide a system that assigns clients to storage gateway pools not on a relative load of each pool but rather based on the types of workloads imposed on the respective storage gateway pools by the clients that are being served by the respective storage gateway pools.

The problems discussed above should be understood as being examples of problems solved by embodiments of the invention disclosed herein and the invention should not be limited to solving the same/similar problems. The disclosed invention is broadly applicable to address a range of problems beyond those discussed herein.

One or more embodiments of the invention may enable one or more of the following: i) improve a deduplication factor for storing data in deduplicated storages, ii) improve a data storage capacity of a networked storage topology by actively assigning clients to be serviced by storages already storing data from other clients performing similar workloads, and iii) decrease the computing resources used to store data by decreasing the total quantity of storage space used to store client data.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A orchestrator for assigning multiple clients to storage gateway pools, comprising:
   a persistent storage comprising workload to pool mappings; and
   a processor programmed to:
     obtain a data storage request for data from a single client amongst the multiple clients;
     identify a workload type associated with the data, wherein the workload type is associated with the data based on an identity of a program used to generate the data;
     select a storage gateway pool of the storage gateway pools using the identified workload type and the workload to pool mappings; and
     assign the selected storage gateway pool to service the data storage request.

2. The orchestrator of claim 1, wherein the storage gateway pool is selected while the storage gateway pool has a higher workload than a second storage gateway pool of the storage gateway pools.

3. The orchestrator of claim 2, wherein the higher workload is a cardinality of a number of clients assigned to service data storage requests by the storage gateway pool.

4. The orchestrator of claim 1, wherein the workload to pool mappings associate each workload type with a respective storage gateway pool of the storage gateway pools.

5. The orchestrator of claim 1, wherein the workload type is identified based further on a type of the data.

6. The orchestrator of claim 1, wherein the workload type is identified based further on a database type in which the data is stored in the single client.

7. The orchestrator of claim 6, wherein the data comprises an entry of a database.

8. The orchestrator of claim 1, wherein the workload type is identified based further on an operating system of the single client.

9. The orchestrator of claim 1, wherein the processor is further programmed to:
   obtain a second data storage request for second data from a second single client amongst the multiple clients;
   identify a second workload type associated with the second data;
   select a second storage gateway pool of the storage gateway pools using the identified second workload type and the workload to pool mappings; and
   assign the selected second storage gateway pool to service the second data storage request.

10. The orchestrator of claim 9, wherein the storage gateway pool of the storage gateway pools stores data of a first database type, wherein the second storage gateway pool stores data of a second database type, wherein the storage gateway pool does not store data of the second database type, wherein the second storage gateway pool does not store data of the first database type.

11. A method of operating an orchestrator for assigning multiple clients to storage gateway pools, comprising:
   obtaining a data storage request for data from a single client amongst the multiple clients;
   identifying a workload type associated with the data, wherein the workload type is associated with the data based on an identity of a program used to generate the data;
   selecting a storage gateway pool of the storage gateway pools using the identified workload type and workload to pool mappings; and
   assigning the selected storage gateway pool to service the data storage request.

12. The method of claim 11, wherein the storage gateway pool is selected while the storage gateway pool has a higher workload than a second storage gateway pool of the storage gateway pools.

13. The method of claim 12, wherein the higher workload is a cardinality of a number of clients assigned to service data storage requests by the storage gateway pool.

14. The method of claim 11, wherein the workload to pool mappings associate each workload type with a respective storage gateway pool of the storage gateway pools.

15. The method of claim 11, further comprising:
   obtaining a second data storage request for second data from a second single client amongst the multiple clients;
   identifying a second workload type associated with the data;
   selecting a second storage gateway pool of the storage gateway pools using the identified second workload type and the workload to pool mappings; and
   assigning the selected second storage gateway pool to service the second data storage request.

16. A non-transitory computer readable medium comprising computer readable program code, which when executed by a computer processor enables the computer processor to perform a method for assigning multiple clients to storage gateway pools, the method comprising:
   obtaining a data storage request for data from a single client amongst the multiple clients;

identifying a workload type associated with the data, wherein the workload type is associated with the data based on an identity of a program used to generate the data;

selecting a storage gateway pool of the storage gateway pools using the identified workload type and workload to pool mappings; and assigning the selected storage gateway pool to service the data storage request.

17. The non-transitory computer readable medium of claim 16, wherein the storage gateway pool is selected while the storage gateway pool has a higher workload than a second storage gateway pool of the storage gateway pools.

18. The non-transitory computer readable medium of claim 17, wherein the higher workload is a cardinality of a number of clients assigned to service data storage requests by the storage gateway pool.

19. The non-transitory computer readable medium of claim 16, wherein the workload to pool mappings associate each workload type with a respective storage gateway pool of the storage gateway pools.

20. The non-transitory computer readable medium of claim 16, wherein the method further comprising:

obtaining a second data storage request for second data from a second single client amongst the multiple clients;

identifying a second workload type associated with the data;

selecting a second storage gateway pool of the storage gateway pools using the identified second workload type and the workload to pool mappings; and assigning the selected second storage gateway pool to service the second data storage request.

* * * * *